United States Patent
Mo et al.

(10) Patent No.: US 11,863,266 B2
(45) Date of Patent: Jan. 2, 2024

(54) BASE STATION WIDE BEAM CODEBOOK DESIGN

(71) Applicant: Samsung Electronics Co., Ltd., Suwon-si (KR)

(72) Inventors: Jianhua Mo, Allen, TX (US); Boon Loong Ng, Plano, TX (US); Ahmad AlAmmouri, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/806,260

(22) Filed: Jun. 9, 2022

(65) Prior Publication Data
US 2023/0015187 A1      Jan. 19, 2023

Related U.S. Application Data

(60) Provisional application No. 63/218,203, filed on Jul. 2, 2021.

(51) Int. Cl.
| | |
|---|---|
| *H04B 7/0456* | (2017.01) |
| *H04W 72/0453* | (2023.01) |
| *H04W 72/044* | (2023.01) |

(52) U.S. Cl.
CPC ......... *H04B 7/0478* (2013.01); *H04B 7/0473* (2013.01); *H04W 72/046* (2013.01); *H04W 72/0453* (2013.01)

(58) Field of Classification Search
CPC ............... H04B 7/0478; H04B 7/0473; H04W 72/0453; H04W 72/046
See application file for complete search history.

(56) References Cited

U.S. PATENT DOCUMENTS

| | | |
|---|---|---|
| 11,190,250 B2 | 11/2021 | Gui |
| 2014/0293904 A1 | 10/2014 | Dai et al. |
| 2018/0331740 A1 | 11/2018 | Orhan et al. |

(Continued)

FOREIGN PATENT DOCUMENTS

| | | |
|---|---|---|
| CN | 108667489 A | 10/2018 |
| CN | 111245493 B | 7/2021 |
| WO | 2016111803 A1 | 7/2016 |

OTHER PUBLICATIONS

International Search Report and Written Opinion dated Sep. 16, 2022 regarding International Application No. PCT/KR2022/008782, 6 pages.

(Continued)

*Primary Examiner* — Jaison Joseph

(57) ABSTRACT

A method, an electronic device with a memory configured to store a hierarchical codebook with a processor operably connected to the memory to perform the method, and a non-transitory computer-readable medium storing instructions that when executed by a processor of an electronic device cause the electronic device to perform the method. The method identifies input data including at least one of an array size, an antenna element spacing, a phase-shifter resolution, a specified coverage region, or an antenna element pattern. The input data is processed by putting an initial beam through a non-decreasing concave utility function which uses a cyclic coordinate descent algorithm that generates a wide beam meeting one or more design specifications. A codebook is produced that includes the wide beam.

20 Claims, 14 Drawing Sheets

(56) References Cited

U.S. PATENT DOCUMENTS

| | | | |
|---|---|---|---|
| 2019/0379429 A1 | 12/2019 | Chang et al. | |
| 2020/0358498 A1* | 11/2020 | Mo | H04B 7/0695 |
| 2020/0358512 A1 | 11/2020 | Zhan et al. | |
| 2021/0067225 A1* | 3/2021 | Mo | H04L 5/0048 |
| 2021/0126697 A1 | 4/2021 | Kumar et al. | |
| 2023/0015187 A1* | 1/2023 | Mo | H04W 72/0453 |

OTHER PUBLICATIONS

Zhu et al., "Learning to Beamform in Heterogeneous Massive MIMO Networks", arXiv:2011.03971v1 [cs.IT], Nov. 2020, 28 pages.

Yang et al., "Multi-antenna Wireless Energy Transfer for Backscatter Communication Systems", IEEE Journal on Selected Areas In Communications, vol. 33, No. 12, Dec. 2015, pp. 2974-2987.

\* cited by examiner

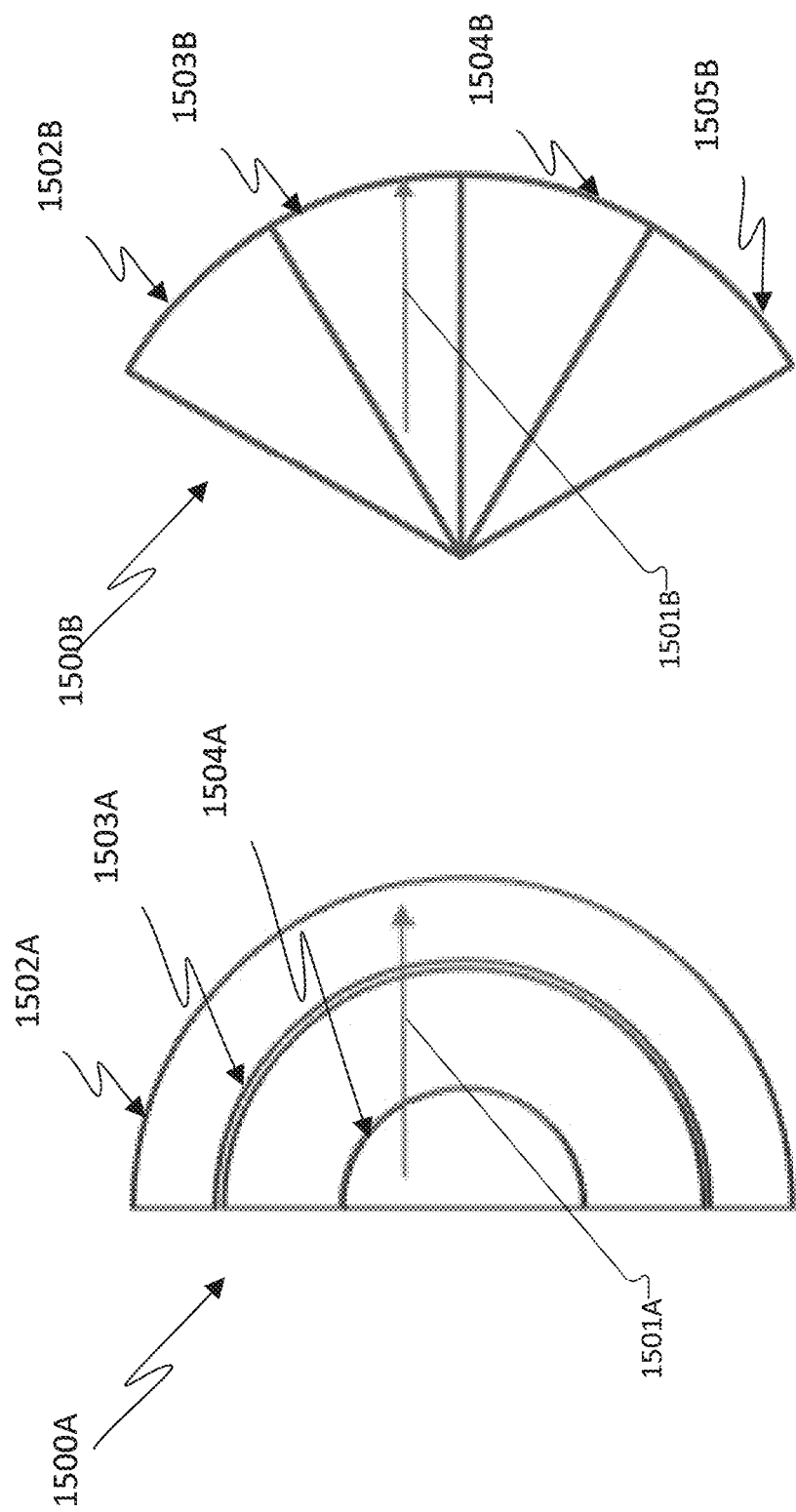

BASE STATION WIDE BEAM CODEBOOK DESIGN

CROSS-REFERENCE TO RELATED AND CLAIM OF PRIORITY

The present application claims priority under 35 U.S.C. § 119(e) to U.S. Provisional Patent Application No. 63/218,203 filed on Jul. 2, 2021, which is hereby incorporated by reference in its entirety.

TECHNICAL FIELD

The present disclosure relates generally to wireless communication systems and, more specifically, the present disclosure relates to apparatuses and methods to generate a beam codebook for base stations.

BACKGROUND

As wireless communication has grown and the number of subscribers to wireless communication services continues to grow quickly, demand of wireless data traffic is rapidly increasing due to the growing popularity among consumers and businesses. To meet the high growth in mobile data traffic and support new applications and deployments, improvements in radio interface efficiency and coverage are of paramount importance. Moreover, this demand for wireless data traffic has increased since deployment of 4G communication systems, and to enable various vertical applications, 5G (e.g., fifth generation) communication systems have been developed and are currently being deployed.

A basic philosophy of 5G or New Radio (NR) in 3rd Generation Partnership Project (3GPP) is to support beam-specific operations for wireless communication between a gNodeB (gNB) and a user equipment (UE). There are several components in the 5G NR specification that can efficiently be operated in a beam-specific manner. Note that the 5G communication system involves implementation to include higher frequency (mmWave) bands, such as 28 GHz or 60 GHz bands or, in general, above 6 GHz bands, so as to accomplish higher data rates, or in lower frequency bands, such as below 6 GHz, to enable robust coverage and mobility support.

The mmWave beam codebook design is very important and challenging for the 5G mmWave base stations. Different from the low frequency bands, narrow beams are needed to support the high data transmission at the mmWave band due to the large mmWave band path-loss. A significant number of narrow beams may be needed to cover a wide angular region, for example, horizontally from −60 degree to +60 degree. Beam creation and the relationship between wide beams (WBs) and narrow beams (NBs) is an important factor in creating a codebook.

SUMMARY

The present disclosure relates to generation of beam codebooks for a base station.

In one embodiment, an apparatus is provided. The apparatus includes an electronic device comprising: a memory configured to store a hierarchical codebook; and a processor operably connected to the memory, the processor configured to: identify input data including at least one of an array size, an antenna element spacing, a phase-shifter resolution, a specified coverage region, or an antenna element pattern; process the input data and an initial beam through a non-decreasing concave utility function using a cyclic coordinate descent algorithm to generate a wide beam meeting one or more design specifications; and produce a codebook including the wide beam.

In another embodiment, a method is provided. The method includes A method comprising: identifying input data including at least one of an array size, an antenna element spacing, a phase-shifter resolution, a specified coverage region, or an antenna element pattern; processing the input data and an initial beam through a non-decreasing concave utility function using a cyclic coordinate descent algorithm to generate a wide beam meeting one or more design specifications; and producing a codebook including the wide beam.

In yet another embodiment, a non-transitory computer readable memory is provided. The non-transitory computer readable memory is provided storing instructions that, when executed by a processor of an electronic device, cause the electronic device to: identify input data including at least one of an array size, an antenna element spacing, a phase-shifter resolution, a specified coverage region, or an antenna element pattern; process the input data and an initial beam through a non-decreasing concave utility function using a cyclic coordinate descent algorithm to generate a wide beam meeting one or more design specifications; and produce a codebook including the wide beam.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many, if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 15A and 15B illustrate examples of WB switching frequency for different WB codebooks according to embodiments of the present disclosure.

DETAILED DESCRIPTION

Figure 1:
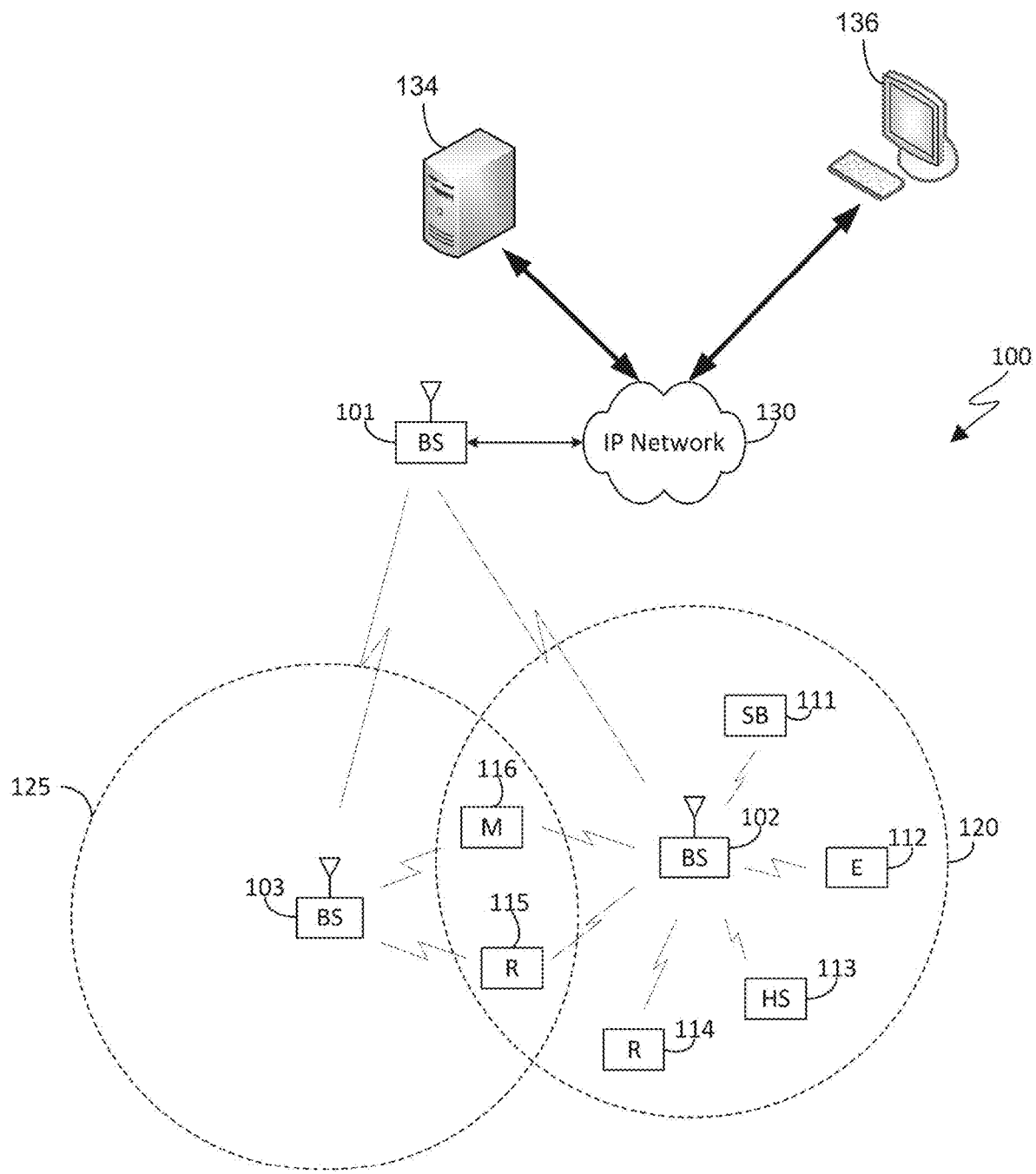
FIG. 1 illustrates an example wireless network according to embodiments of the present disclosure.

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system."

The 5G communication system is considered to be implemented in higher frequency (mmWave) bands, e.g., 60 GHz bands, so as to accomplish higher data rates. To decrease propagation loss of the radio waves and increase the transmission coverage, the beamforming, massive multiple-input multiple-output (MIMO), full dimensional MIMO (FD-MIMO), array antenna, an analog beam forming, large scale antenna techniques and the like are discussed in 5G communication systems.

In addition, in 5G communication systems, development for system network improvement is under way based on advanced small cells, cloud radio access networks (RANs), ultra-dense networks, device-to-device (D2D) communication, wireless backhaul communication, moving network, cooperative communication, coordinated multi-points (CoMP) transmission and reception, interference mitigation and cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

In 5G or the other wireless systems, mmWave is a major band on which high throughputs can be achieved. The propagation on the mmWave bands suffers more significant path loss than that in the sub-6 GHz bands. To compensate the increased path loss, multiple antenna elements can be simultaneously activated to form a narrow beam with high gain. The narrow beamwidth, however, incurs an overhead for aligning the beam direction to the best signal transmission/reception directions.

Embodiments of the present disclosure present a method of generating a beam codebook including wide beams when a narrow beam is given and creating wide beams to cover those narrows beams that would be advantageous in terms of power, speed, efficiency, etc.

Embodiments of the present disclosure also recognize that formulating a concave utility maximization problem and adopting the cyclic coordinate descent algorithm can be used to design the wide beam, where determining to output the wide beam can be predicated on the wide beam pattern meeting the design specifications based on such criteria as peak gain and half-powered beamwidth (HPBW). These design specifications can be requirements of the system, for the base station to maintain contact with the UE, or any other feature that would be advantageous to the design of the WBs or codebook. Moreover, embodiments of the present disclosure permit the codebook to offer different types, shapes, and powers of wide beams to accomplish the objectives of using wide beams to cover narrow beam areas or volumes.

Additionally, embodiments of the present disclosure also provide for a method of using smaller WB for the cell-center area and larger WB for the cell-edge area and adopting a WB codebook with less WB switching frequency to support mobile UE.

FIGS. 1 through 5 below describe various embodiments implemented in wireless communications systems and with the use of orthogonal frequency division multiplexing (OFDM) or orthogonal frequency division multiple access (OFDMA) communication techniques. The descriptions thereof are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101, a gNB 102, and a gNB 103. The gNB 101 communicates with the gNB 102 and the gNB 103. The gNB 101 can also communicate with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of gNB 101, gNB 102 and gNB 103 include one or more two-dimensional (2D) antenna arrays as described in embodiments of the present disclosure. In some embodiments, one or more of gNB 101, gNB 102 and gNB 103 support the codebook design and structure for systems having 2D antenna arrays.

In some embodiments, the network 130 facilitates communications between at least one server 134 and various client devices, such as client device 136. Server 134 includes any suitable computing or processing device that can provide computing services for one or more client devices. Server 134 could, for example, include one or more processing devices, one or more memories storing instructions and data, and one or more network interfaces facilitating communication over the network 130.

Client device 136 represents any suitable computing or processing device that interacts with at least one server or other computing device(s) over the network 130. In this example, the client device is represented as a desktop computer, but other non-limiting examples of client devices can include a mobile telephone, laptop computer, or tablet computer. However, any other or additional client devices could be used in the wireless network 100.

In this example, client devices can communicate indirectly with the network 130. For example, some client devices can communicate via one or more base stations, such as cellular base stations or eNodeBs. Also, client devices can communicate via one or more wireless access points (not shown), such as IEEE 802.11 wireless access points. Note that these are for illustration only and that each client device could communicate directly with the network 130 or indirectly with the network 130 via any suitable intermediate device(s) or network(s).

As described in more detail below, wireless network 100 can be a 5G communication system in which a UE 116 and/or BS 102 can adapt and/or use the codebook(s) described herein for use in wireless communication with each other. In addition, wireless network 100 can enable a computing device, such as server 134, to design and disseminate codebooks or elements thereof that can either be performed offline, may not use instantaneous computations and dissemination, or simply to save power at the BSs when convenient for the system, to disseminate codebooks or some subset of information used for the codebooks to electronic devices, such as UE 116 and BS 102, for wireless communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

Figure 2:
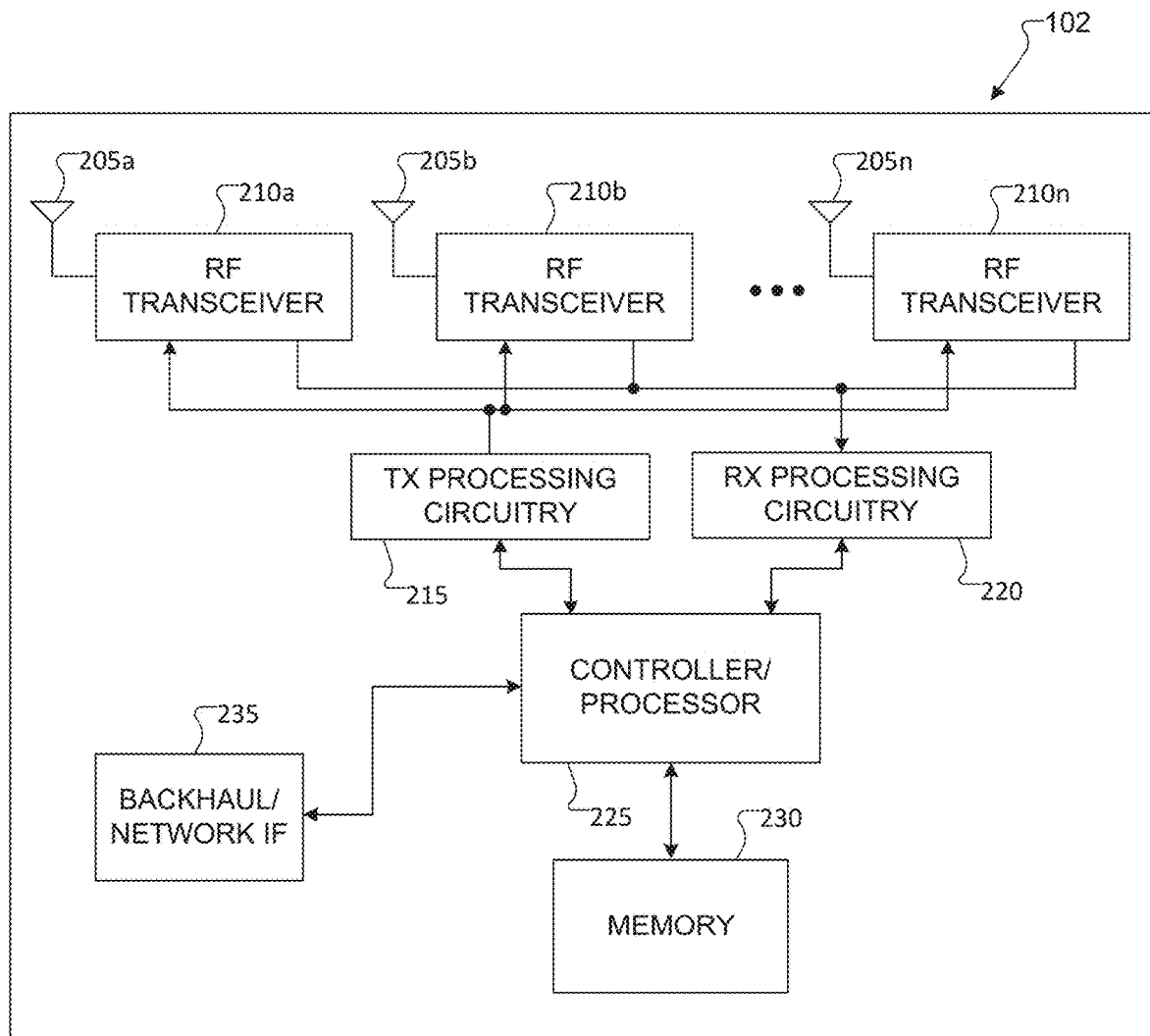
FIG. 2 illustrates an example base station (BS) according to embodiments of the present disclosure.

FIG. 2 illustrates an exemplary base station example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple radio frequency (RF) transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate intermediate frequency (IF) or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. That is, the controller/processor 225 can perform the method in part or in whole described herein, identify inputs, and create the codebook. Also, any of a wide variety of other functions can be supported in the gNB 102 by the controller/processor 225. In some embodiments, the controller/processor 225 includes at least one microprocessor or microcontroller.

In certain embodiments, the controller/processor 225 could support beam forming or directional routing operations in which outgoing signals from multiple antennas 205a-205n are weighted differently to effectively steer the outgoing signals in a desired direction and create and control narrow beams and wide beams. Any of a wide variety of other functions could be supported in the gNB 102 by the controller/processor 225.

The controller/processor 225 is also capable of executing programs and other processes resident in the memory 230, such as an operating system (OS). The controller/processor 225 can move data into or out of the memory 230 as used by an executing process.

The controller/processor 225 is also capable of supporting channel quality measurement and reporting for systems having 2D antenna arrays as described in embodiments of the present disclosure. In some embodiments, the controller/processor 225 supports communications between entities, such as web real-time communication (RTC). The controller/processor 225 can move data into or out of the memory 230 as used by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other read only memory (ROM). In certain embodiments, a plurality of instructions, such as a BIS algorithm is stored in memory 230. The plurality of instructions are configured to cause the controller/processor 225 to perform the BIS process and to decode a received signal after subtracting out at least one interfering signal determined by the BIS algorithm.

As described in more detail below, the transmit and receive paths of the gNB 102 (implemented using the RF transceivers 210a-210n, TX processing circuitry 215, and/or RX processing circuitry 220) support the generation and use of WB codebooks.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 3:
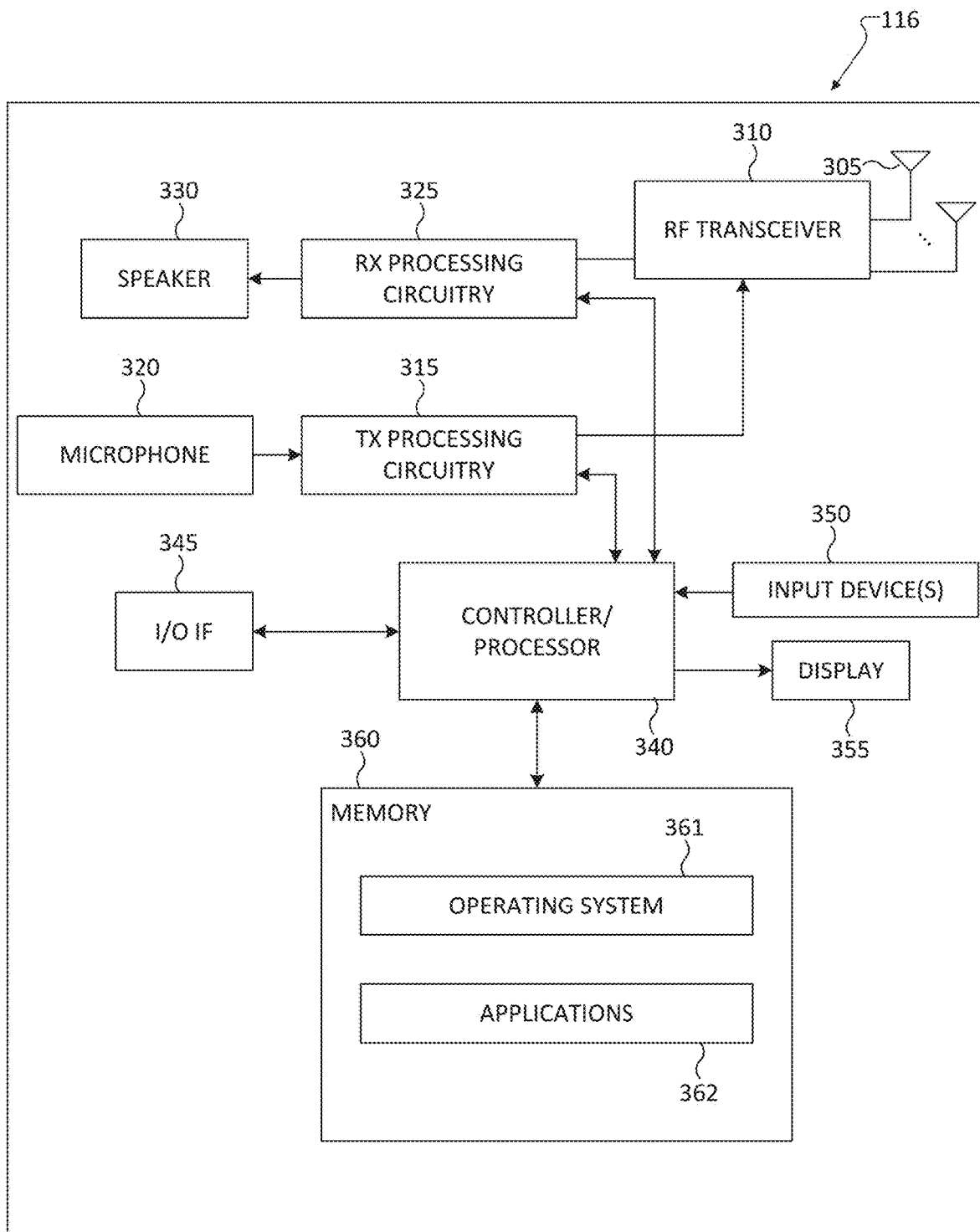
FIG. 3 illustrates an example UE according to embodiments of the present disclosure

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a controller/processor 340, an input/output (I/O) interface (IF) 345, a touchscreen 350 (or keypad), a display 355, and a memory 360. The memory 360 includes an operating system (OS) 361 and one or more applications 362.

The RF transceiver 310 receives from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the controller/processor 340 for further processing (such as for web browsing data).

The TX processing circuitry 315 receives analog or digital voice data from the microphone 320 or other outgoing baseband data (such as web data, e-mail, or interactive video game data) from the controller/processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The controller/processor 340 can include one or more processors or other processing devices and execute the OS 361 stored in the memory 360 in order to control the overall operation of the UE 116. For example, the controller/processor 340 could control the reception of forward channel signals and the transmission of reverse channel signals by the RF transceiver 310, the RX processing circuitry 325, and the TX processing circuitry 315 in accordance with well-known principles. In some embodiments, the controller/processor 340 includes at least one microprocessor or microcontroller.

The controller/processor 340 is also capable of executing other processes and programs resident in the memory 360. The controller/processor 340 can move data into or out of the memory 360 as used by an executing process. In some embodiments, the controller/processor 340 is configured to execute the applications 362 based on the OS 361 or in response to signals received from gNBs or an operator. The controller/processor 340 is also coupled to the I/O interface 345, which provides the UE 116 with the ability to connect to other devices, such as laptop computers and handheld computers. The I/O interface 345 is the communication path between these accessories and the controller/processor 340.

The controller/processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the controller/processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the controller/processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
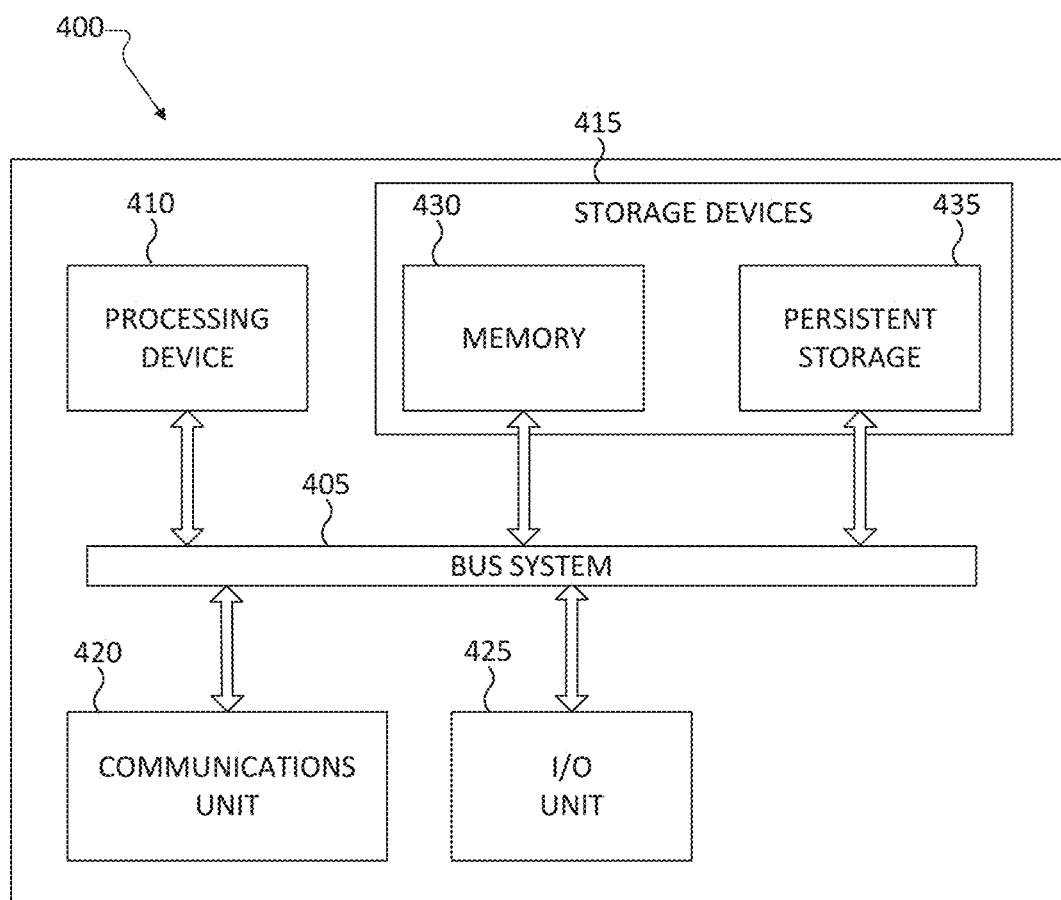
FIG. 4 illustrates a diagram of a networked computing device according to embodiments of the present disclosure.

FIG. 4 illustrates an exemplary networked computing device in accordance with various embodiments of this disclosure. In one embodiment, the networked computing device 400 is a server, such as server 134 in FIG. 1.

As shown in FIG. 4, the computing device 400 includes a bus system 405, which supports communication between at least one processor 410, at least one storage device 415, at least one communications unit 420, and at least one input/output (I/O) unit 425.

The processor 410 executes instructions that may be loaded into a memory 430. The processor 410 may include any suitable number(s) and type(s) of processors or other devices in any suitable arrangement. Example types of processor 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random-access memory or any other suitable volatile or non-volatile storage device(s). The persistent storage 435 may contain one or more components or devices supporting longer-term storage of data, such as a ready only memory, hard drive, flash memory, or optical disc.

The communications unit 420 supports communications with other systems or devices. For example, the communications unit 420 could include a network interface card or a wireless transceiver facilitating communications over the network 130. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

Note that while FIG. 4 is described as representing the server 134 of FIG. 1, the same or similar structure could be used in one or more client devices. For example, client device 136 can have the same or similar structure as shown in FIG. 4.

As described in more detail below, a computing device such as server 134 in FIG. 1 can be used to design and disseminate codebooks for use by an electronic device, such as UE 116 and/or BS 102 for communicating over network 100 or may be used to store and calculate data necessary for the implementation of the method described herein, especially in situations where real-time data is not necessary or, on the other hand, where the calculations are more efficiently or effectively done by the networked computing device 400. The networked computing device 400 could also maintain or determine any data or calculations that can be done offline and then transmitted to another component in network 100.

Figure 5:
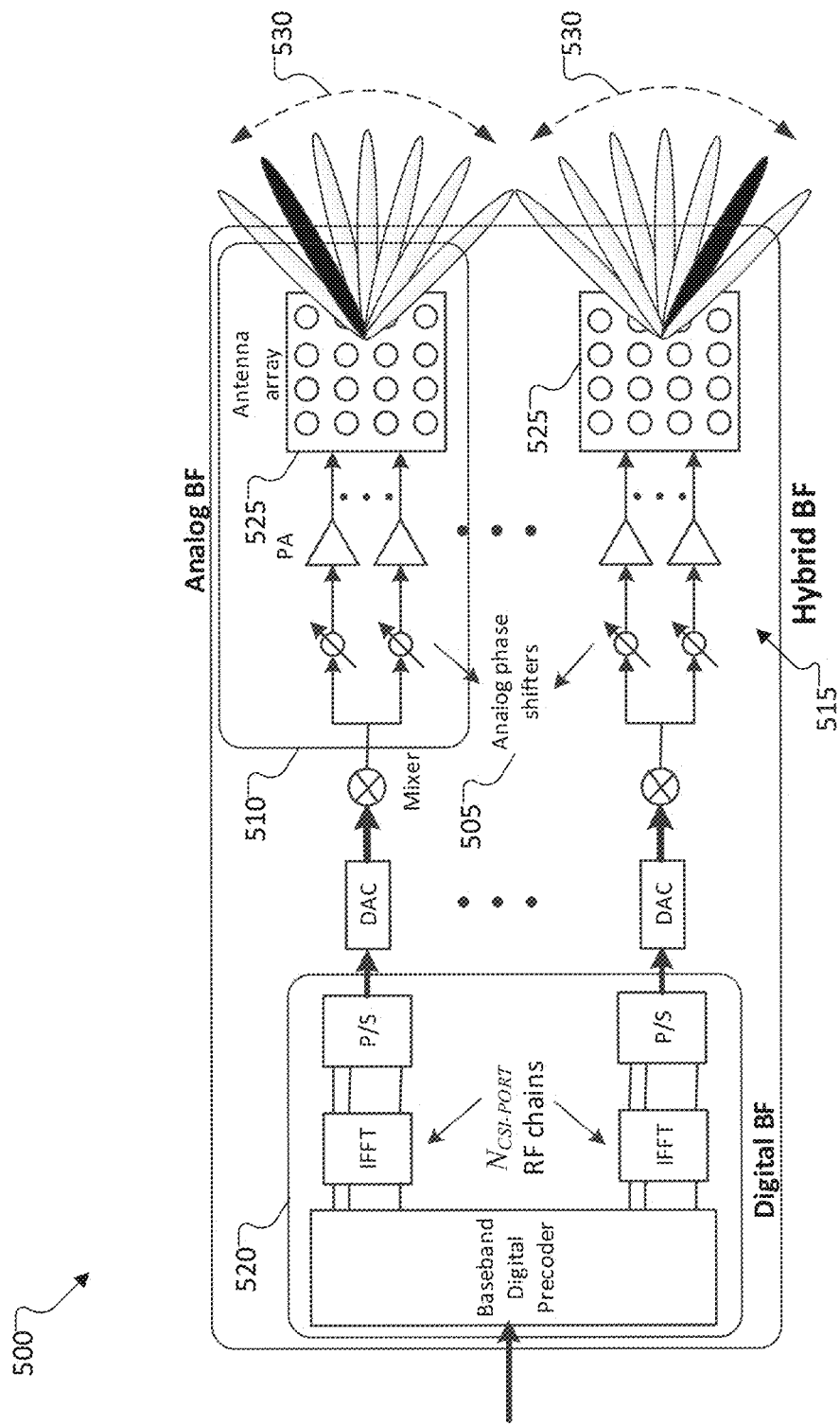
FIG. 5 illustrates an example antenna according to embodiments of the present disclosure.

FIG. 5 illustrates an example antenna blocks 500 according to embodiments of the present disclosure. The embodiment of the antenna 500 illustrated in FIG. 5 is for illustration only. FIG. 5 does not limit the scope of this disclosure to any particular implementation of the antenna 500. In certain embodiments, one or more of gNB 102 or UE 116 include the antenna 500. For example, one or more of antenna 205 and its associated systems or antenna 305 and its associated systems can be configured the same as antenna 500.

Rel.14 LTE and Rel.15 NR support up to 32 Channel State Information Reference Signal (CSI-RS) antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of analog-to-digital converters (ADCs) and digital-to-analog converters (DACs) at mmWave frequencies).

In the example shown in FIG. 5, the antenna 500 includes analog phase shifters 505, an analog beamformer (BF) 510, a hybrid BF 515, a digital BF 520, and one or more antenna arrays 525. In this case, one CSI-RS port is mapped onto a large number of antenna elements in antenna arrays 525, which can be controlled by the bank of analog phase shifters 505. One CSI-RS port can then correspond to one sub-array which produces a narrow analog beam through analog beamforming by analogy BF 510. The analog beam can be configured to sweep 530 across a wider range of angles by varying the phase shifter bank 505 across symbols or subframes. The number of sub-arrays (equal to the number of RF chains) is the same as the number of CSI-RS ports NCSI-PORT. A digital BF 515 performs a linear combination across NCSI-PORT analog beams to further increase precoding gain. While analog beams are wideband (hence not frequency-selective), digital precoding can be varied across frequency sub-bands or resource blocks.

Since the above system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

Additionally, the antenna 500 system is also applicable to higher frequency bands such as >52.6 GHz (also termed the FR4. In this case, the system can employ only analog beams. Due to the O2 absorption loss around 60 GHz frequency (~10 decibels (dB) additional loss @100 m distance), larger number of and sharper analog beams (hence larger number of radiators in the array) will be needed to compensate for the additional path loss.

An antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

As operating frequency bands in NR become higher, the UE is evolving to accommodate a plurality of antenna arrays 525 or panels (each panel is able to transmit via one analog beam, e.g., analog BF 510) to enhance aspects of multi-beam operation such as coverage enhancement, beam failure event minimization, fast beam switching, and the like. By utilizing the capability of multiple panels, UE 116 is able to obtain a variety of diversity gains, which comes from dynamic selection of panel(s) with the best quality in terms of performance that systems want to optimize. For example, in 3GPP 5G NR Rel-17, features to facilitate UL beam/panel selection for UEs equipped with multiple panels is identified and specified under a unified transmission configuration indicator (TCI) framework, in order to mitigate UL coverage loss from several aspects such as maximum permissible exposure (MPE) issues on UE 116.

For example, a beam corresponds to a spatial transmission/reception filter that is used by the UE 116 and/or gNB 102. In one example, a beam can correspond to a spatial reception filter that is used by the UE 116 to receive a reference signal, such as synchronization signals (SS) and physical broadcast channel (PBCH) (SS/PBCH block (SSB)) and/or a CSI-RS and so on. In another example, a beam can correspond to a spatial transmission filter that is used by the UE 116 to transmit a reference signal, such as an UL sounding reference signal (SRS) and so on.

A beam training and measurement procedure can include, for example, a procedure wherein the gNB 102 configures the UE 116 with a set of reference signal (RS) resources, such as SSB resources and/or CSI-RS resources, as well as a configuration for report settings, such that the UE can report beam quality metric(s) measurement(s), such as Reference Signal Received Power (RSRP), Reference Signal Received Quality (RSRQ), Received Signal Strength Indicator (RSSI), Signal to Noise Ratio (SNR), Signal to Interference and Noise Ratio (SINR), and so on, each of which can be, e.g., a L-1 measurement or a filtered L-3 measurement. In one example, a UE 116 and/or a gNB 102 can transmit a reference signal (RS), such as a Synchronization Signal Block (SSB) or a CSI-RS or an SRS with a number of repetitions using a same spatial transmission filter in multiple occasions, so that the gNB 102 and/or UE 116, respectively, can receive the RS with different spatial reception filters, in order to facilitate beam sweeping and identification of a candidate/best beam based on a quality metric, such as L1/L3 RSRP or SINR. In one example, a selection of different spatial reception filters and/or quality metric and/or selection procedure can be per UE/gNB implementation.

A beam indication procedure can include, for example, a procedure wherein the gNB 102 can indicate to the UE 116 to transmit an uplink channel (and/or a second uplink signal) with a same spatial filter that was used to receive a (first) reference signal. In another example, the gNB 102 can indicate to the UE 116 to receive a downlink channel (and/or a second downlink signal) with a same spatial filter that was used to receive a (first) reference signal. Such indication can be, e.g., a Downlink Control Information (DCI) and/or MAC Control Element (MAC-CE), and/or radio resource control (RRC) signaling.

In one example, an antenna panel or, simply a panel, can refer to an antenna array 525 or an antenna sub-array connected to one or multiple RF chains. In one example, a panel can be referred to as a transmission-reception entity (TRE), which can virtualize multiple physical panels into a single virtual panel, based on a transparent UE/gNB implementation, such as MIMO diversity scheme(s).

A millimeter-wave (mmWave) beam codebook design is very important and challenging for the 5G mmWave base stations. Different from the low frequency bands, the mmWave antenna is inherently directional and mmWave signal can be very sensitive to blockage, reflection, etc. Certain codebook designs are constructed in the angular domain where necessary to cover the angular domain. For example, 120° horizontal scan range (for example, −60°≤ϕ≤60°), and 60° vertical scan range (for example, 70°≤θ≤130°). It is noted that angular domain designed ignore a few important factors in real deployment. In certain angular designs, a path-loss difference is ignored. For example, when UEs are distributed on the ground, a θ=95° (i.e., cell-edge) region has much weaker channel gain compared to the region θ≥120° (i.e., cell-center). In certain angular designs, blockage is not considered, for example, when the mmWave cannot penetrate an obstacle well; therefore, a beam shooting towards a building is not able to serve the UE behind the building. Additionally, certain angular designs ignore the reflection and multi-path, which can be utilized to serve the non-line-of-sight (nLoS) UEs.

Certain embodiments in this disclosure provide methods to generate a beam codebook for a base station. Certain embodiments obtain input information including the antenna element radiation pattern, antenna spacing and antenna size, and UE channel information to generate a site-specific and dynamic codebook design. Although mmWave bands are used as example in this disclosure, the embodiments in this disclosure can also be applied to other frequency bands as well. The site-specific codebook design corresponds to a codebook designed for one or more localize attributes or environmental conditions for a particular base station utilizing the site-specific codebook. That is, the site-specific codebook is uniquely designed for use by a particular base station.

In certain embodiments, a site-specific BS beam codebook is designed based on a ray tracing data and by an iterative algorithm. Ray tracing simulation tool, for instance, Wireless InSite, can simulate multiple rays (up to 250 rays) for each transmitter-receiver pair. Assume that the strongest L rays are generated, the data extracted from ray tracing simulation tool is as follows:

1. $P\_(k,l)$: ray gain
2. $\theta\_(k,l)$: Elevation angle of departure from BS,
3. $\phi\_(k,l)$: Azimuth angle of departure from BS, where $l(1 \leq l \leq L)$ represents the $l^{th}$ strongest path and $k(1 \leq k \leq K)$ stands for the index of UE.

In a non-limiting embodiment, the wide beam design is a data-driven method. If the design objective is assumed to be separable, such as expressed in a concave utility faction in the form of the following equation:

$$h(w) = \Sigma_{i \in I} f_i(w^H M_i w) \quad (1)$$

and $f_i(x)$ is a continuous concave function and has the gradient or sub gradient, then an iterative algorithm is proposed to find the beam, then the utility function is a concave non-decreasing function, there is diminishing return as the beamforming gain increases. $f_i$ could be dependent or independent on the index i and $f_i$ can be non-differentiable.

Note, too, that many metrics of interest are actually concave functions of the beamforming gains. For example: if $f_i(x) = \ln x$, $\forall i$, then it is similar to the idea of "proportional fairness" in scheduling. For another example: if $f_i(x) = \log_2(1+\gamma x)$, $\forall i$, then it is to maximize the mean data rate.

A cyclic coordinate descent algorithm can sequentially update each entry $w_\ell$ until convergence. The iterative algorithm is guaranteed to converge to a stationary point (local optimum), but not guaranteed to be the optimum.

The resultant beam satisfies the KKT condition and is a local optimal solution. Advantages of this proposed method are as follows: no assumption of (1) an omni-directional element pattern and (2) a regular array layout, e.g., half-wavelength spacing; computationally efficient (by using a coordinate descent algorithm); and flexible choice of the design metric, i.e., mean gain, mean data rate, detection probability.

Figure 6:
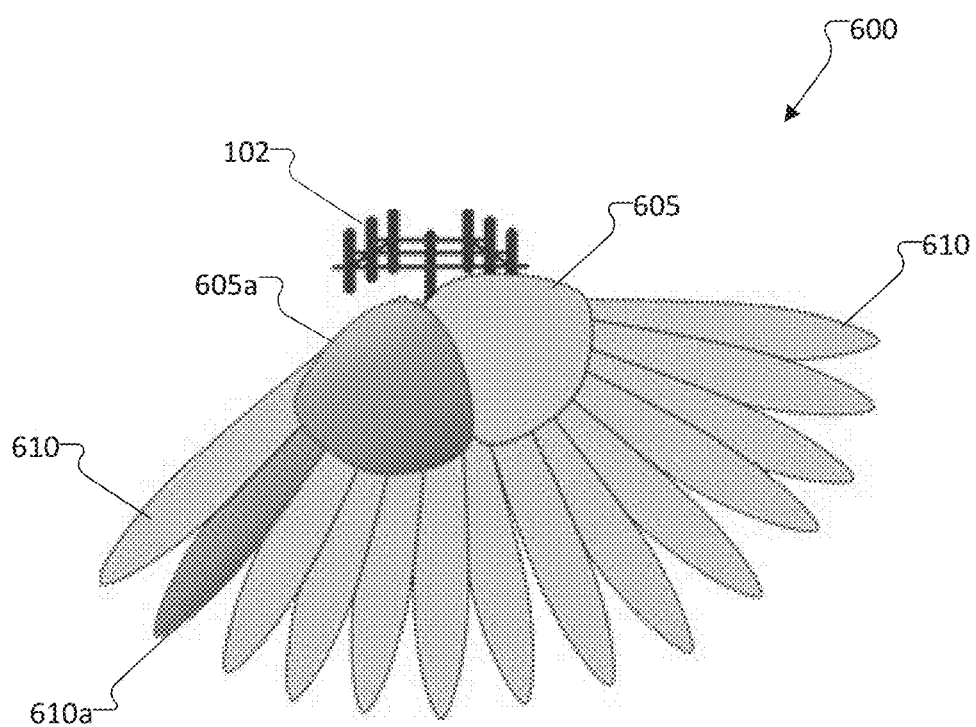
FIG. 6 illustrates an example BS with two wide beam and fourteen narrow beams according to embodiments of the present disclosure.

FIG. 6 illustrates a base station with two wideband beams and fourteen narrowband beams according to embodiments of the present disclosure. The embodiment of the base station beams 900 shown in FIG. 6 is for illustration only. Other embodiments could be used without departing from the scope of the present disclosure.

In the example shown in FIG. 6, gNB 102 is configured with two wideband (WB) beams 605 and fourteen narrowband (NB) beams 610. In certain embodiments, the generation of a codebook is site-specific. FIG. 6 shows an example of 2 wide beams and 14 narrow beams, where each wide beam has 7 children narrow beams. The example only shows the beam distribution in one dimension. The wide beam shape in one dimension is only determined by the center direction $\phi_c$ and the beam width $\Delta\phi$. The coverage region of the wide beam is $$\left[\phi_c - \frac{\Delta\phi}{2}, \phi + \frac{\Delta\phi}{2}\right].$$

In a deployment of cellular network, the beambook may cover a 2D angular region to serve the UE of different heights and at different locations of a cell, for example, −60°≤ϕ≤60°, 80°≤θ≤120. There are more flexibility and challenges to determine the wide beam shape and the whole wide beam codebook, and such determinations could be performed by any of the processors and/or memories as described in more detail in FIG. 11, below.

Figure 7:
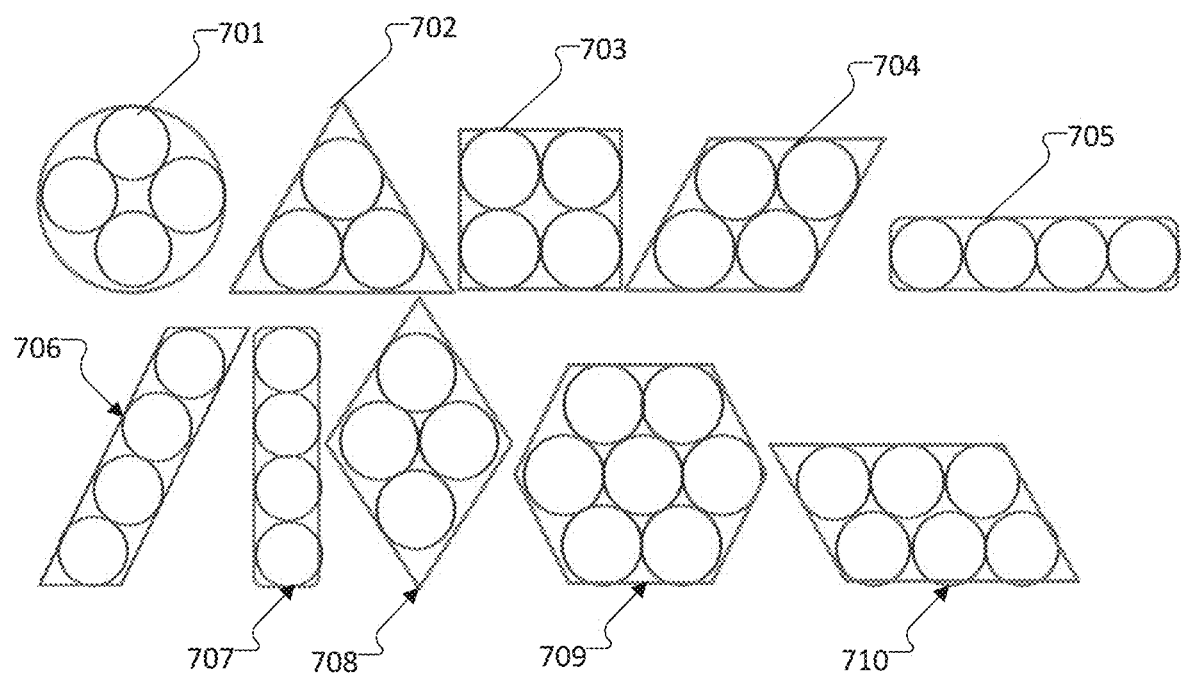
FIG. 7 illustrates an example of the various ways of clustering narrow beams and the corresponding wide beam shapes according to embodiments of the present disclosure.

FIG. 7 shows, in one non-limiting embodiment, examples of different possibilities of wide beams (WBs) being designed to cover different combinations of narrow beams, thus offering a flexible wide beam design of different shapes and could be performed by any of the processors and/or memories as described in more detail in FIG. 11, below. For example, circle, triangle, diamond, square, parallelogram, trapezoid, hexagon, bar, etc. In FIG. 7, which illustrates the various ways of clustering narrow beams and the corresponding wide beam shapes, each small circle stands for the main lobe of a narrow beam (NB). The narrow beams are usually placed close to each other to avoid coverage hole. FIG. 7 shows several different shapes of wide beams, which could be produced in accordance with the descriptions herein and utilizing the units described in the discussion under FIG. 11 and antennas 500 and 600. The square WB could cover 4 NBs while are placed on a grid, while a parallelogram WB could cover 4 NBs placed in a zig-zag manner. In FIG. 7, example 701 shows 4 narrow beams covered by a circular wide beam; example 704 shows 3 narrow beams covered by a triangular wide beam; example 703 shows four narrow beams covered by a square wide beam; example 704 shows four narrow beams covered by a rhomboid wide beam; example 705 shows four narrow beams covered by a rectangle lengthier in the horizontal direction; example 706 shows four narrow beams covered by a parallelogram-shaped wide beam; example 707 shows four narrow beams covered by a rectangle lengthier in the vertical direction; example 708 shows four narrow beams covered by a diamond-shaped wide beam; example 709 shows seven narrow beams covered by hexagonal shaped wide beam; and example 710 shows six narrow beams covered by a parallelogram shaped wide beam.

Figure 8:
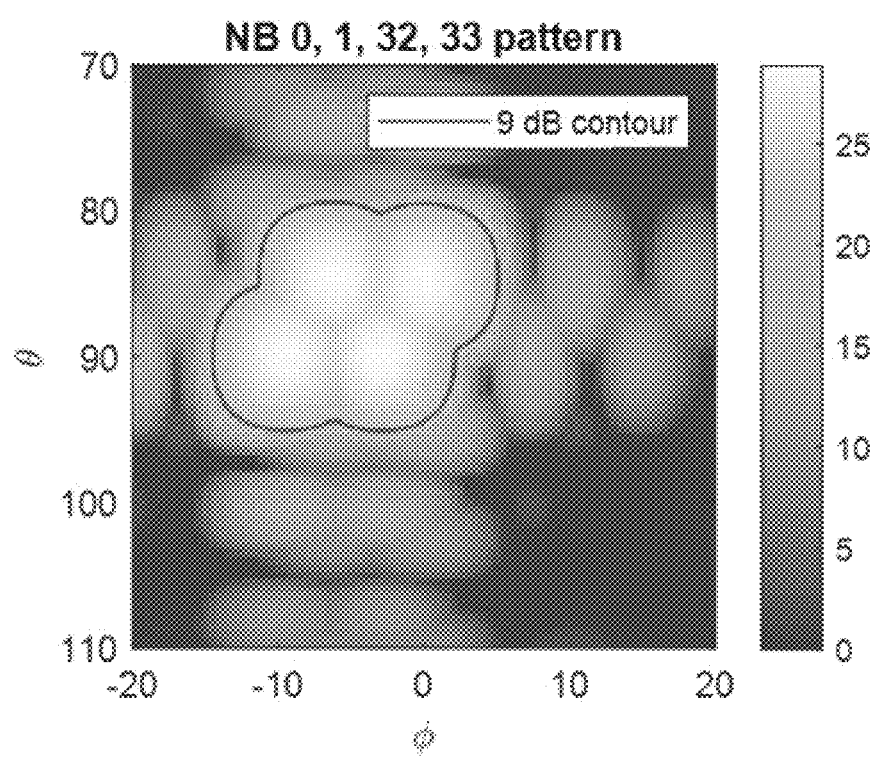
FIG. 8 illustrates an example of a coverage region of the WB is defined as the area within the 9 dB contour of four NBs according to embodiments of the present disclosure.

FIG. 8 shows, in another non-limiting embodiment, the WB coverage region could be defined based on the contour of the composite radiation pattern of NBs and could be performed by any of the processors and/or memories as described in more detail in FIG. 11, below. FIG. 8 illustrates an example of the composite radiation of the 4 NBs. The coverage region of a WB, which is supposed to cover these 4 NBs, is defined as the area enclosed by the 9 dB contour.

Figure 9:
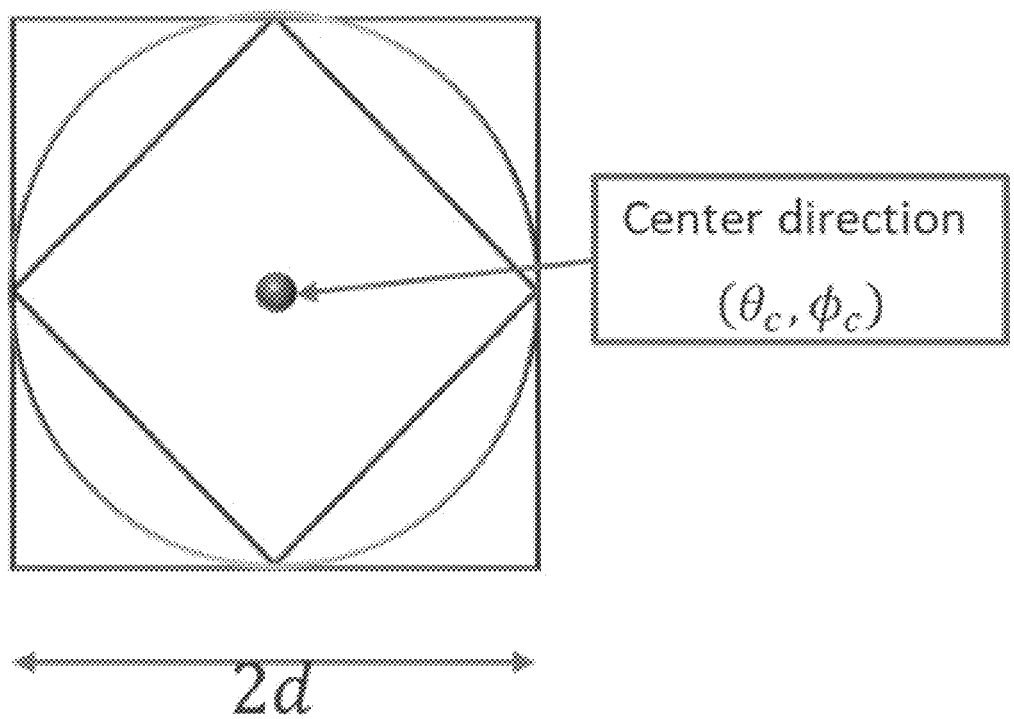
FIG. 9 illustrates an example of defining the beam coverage region with parameters according to embodiments of the present disclosure.

FIG. 9 shows, in yet another non-limiting embodiment, the covered region could be determined by equations and could be performed by any of the processors and/or memories as described in more detail in FIG. 11, below. For example, the three-coverages given in FIG. 9 are centered at the direction $(\theta_c, \phi_c)$ and represented as:

$$\text{Diamond: } |\theta-\theta_c|+|\phi-\phi_c| \leq d \quad (2)$$

$$\text{Circle: } \sqrt{(\theta-\theta_c)^2+(\phi-\phi_c)^2} \leq d \quad (3)$$

$$\text{Square: } \max(|\theta-\theta_c|,|\phi-\phi_c|) \leq d \quad (4)$$

The parameter d is used to adjust the beamwidth.

In another non-limiting embodiment, a wide beam design method is shown given the coverage region, the concave utility function method is used to generate the WB and could be performed by any of the processors and/or memories as described in more detail in FIG. 11, below. The method first sample the angular directions from the specified coverage region. That specified coverage region could be a requirement to maintain coverage a UE, a requirement to attain or maintain a certain physical characteristic for the WB, or some other requirement or specification concerning the equipment, the beams, or both, or even some external standard or specification. Assuming that the array response at the direction is $a(\theta,\phi)$, and the beamforming weights of the WB is w, the beam gain pattern is represented by the following equation:

$$P(\theta,\phi)=p(\theta,\phi)w^H a(\theta,\phi)a(\theta,\phi)^H w \quad (5)$$

The beam is designed to maximize the sum of a concave utility of the beamforming gain, as shown below:

$$\max_w \sum_{(\theta,\phi) \in C} f(p(\theta, \phi)w^H a(\theta, \phi)a(\theta, \phi)^H w) \quad (6)$$

C is the angular coverage region;
$a(\theta, \phi)$ is the array response;
$p(\theta, \phi)$ is the antenna element pattern; and
$f(x)$ is a non-decreasing concave utility function.

The utility function should be non-decreasing concave function. In one non-limiting option, the utility function $f(x)$ could be set as $\log(x)$, where $\log(x)$ is a concave function.

In regard to a logarithmic utility function, by Jensen's inequality, the equation becomes the following $$\frac{1}{N}\sum_{i=1}^{N} \log P_i \leq \log\left(\frac{1}{N}\sum_{i=1}^{N} P_i\right) \quad (7)$$

For example, $\log 10 + \log 90 \approx 6.80 < 7.78 \approx \log 40 + \log 60$. Note that $w^H a(\theta, \phi)a(\theta, \phi)^H w$ is the radiation power at the direction $(\theta, \phi)$. There is a total radiation constraints $(\Sigma_i P_i < P_{total})$, because of the law of conservation of energy. When maximizing $\Sigma_{i=1}^N \log P_i$ subject to a total power constraint $(\Sigma_i P_i < P_{total})$, a fair allocation of the power is preferred. Fair allocation of the radiation power over the specified coverage region yields a wide beam. Thus, an efficient iterative algorithm is created to find a local optimum of w.

Figure 10:
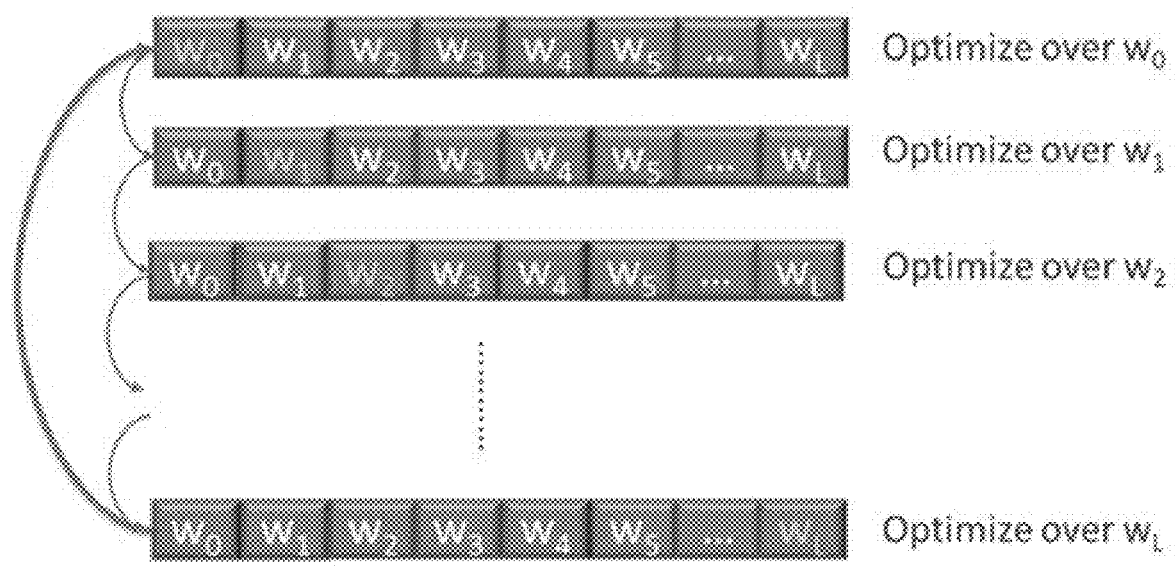
FIG. 10 illustrates examples of a cyclic coordinate descent algorithm according to embodiments of the present disclosure.

FIG. 10 illustrates a cyclic coordinate descent algorithm, which sequentially updates one of the beamforming weights. Such an algorithm could be adopted to solve the above optimization problem and could be performed by any of the processors and/or memories as described in more detail in FIG. 11, below. Assume that there are L+1 antenna elements, the coordinate descent algorithm first optimizes $w_0$ while keeping other weights unchanged. It then optimizes $w_1$, $w_3$, ... $w_L$, then back to optimize $w_0$. The algorithm stops when it converges to a local optimal w.

Moreover, an iterative algorithm to update the beam could take the form of the following equation:

$$\max \sum_{i \in I} f_i(w^H M_i w) \quad (8)$$

$$\text{s.t.: } w_\ell^* w_\ell = \frac{P}{L}, \forall \ell \arg(w_\ell) \in \left\{0, \frac{2\pi}{2^b}, \frac{4\pi}{2^b}, \frac{2(2^b-1)\pi}{2^b}\right\}, \forall \ell$$

$\arg(x)$: phase of $x$

As such, then the cyclic coordinate descent algorithm, could be expressed as follows to sequentially update each entry $w_l$ (it is derived from KKT condition), can be solved with the following equation:

$$w_\ell^{(n+1)} = \sqrt{\frac{P}{L}} \exp\left\{jQ_b\left(\arg\left(\sum_{i \in I} f_i'((w^{(n)})^H M_i w^{(n)})[M_i]_{\ell,:} w^{(n)}\right)\right)\right\} \quad (9)$$

where $f_i'(x)$: gradient if $f_i(x)$ is differentiable(subgradient if $f_i(x)$ is not differentiable), (10)

$[M_i]_\ell$ the $\ell$-th row of the matrix $M_i$, and (11)

(12)

$Q_b(x)$ is a function quantize the angle from $[0, 2\pi)$ to $\left\{0, \frac{2\pi}{2^b}, \frac{4\pi}{2^b}, \frac{2(2^b-1)\pi}{2^b}\right\}$ where the iterative algorithm is guaranteed to converge to a stationary point.

Figure 11:
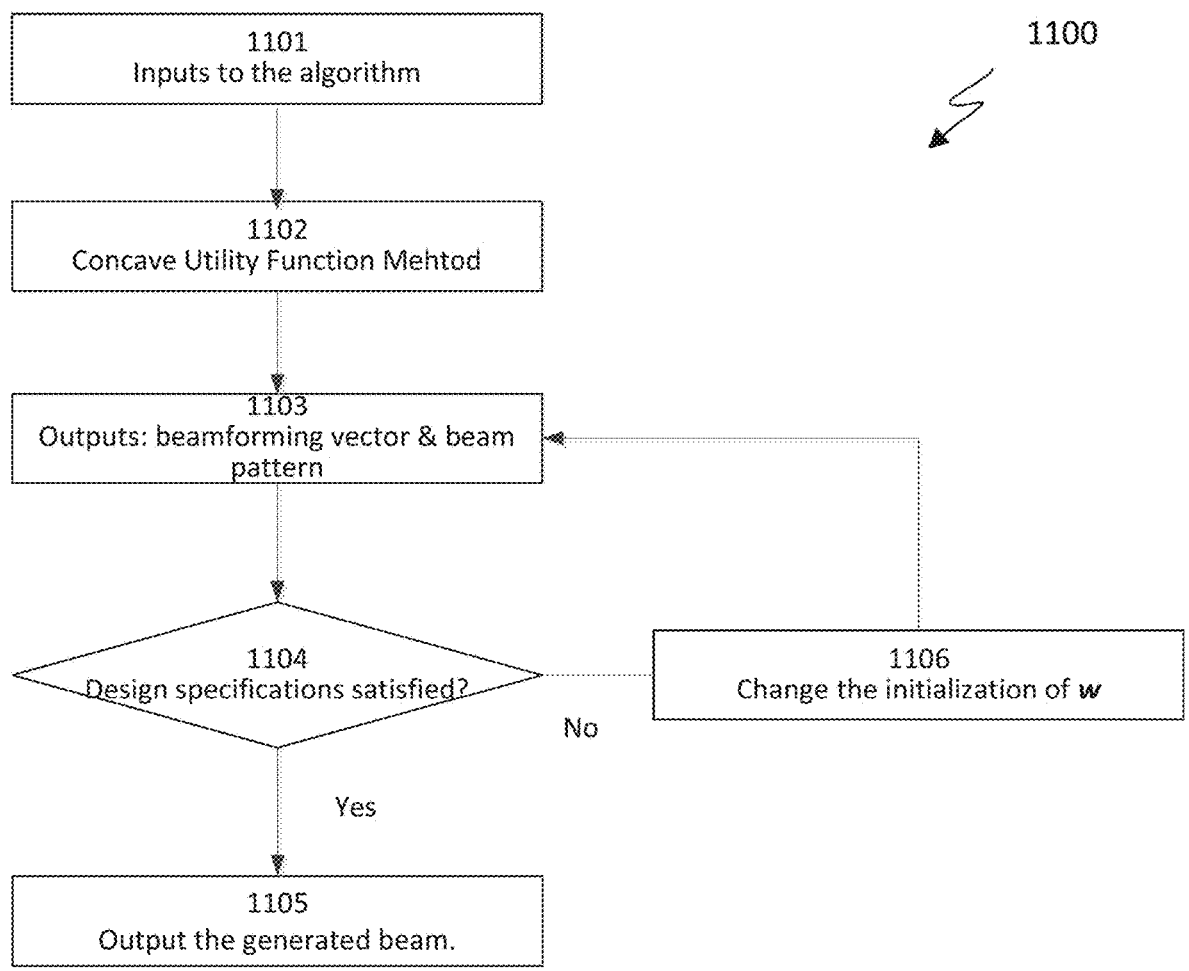
FIG. 11 illustrates a flow chart of the wide beam design according to embodiments of the present disclosure.

In FIG. 11 another non-limiting embodiment is shown detailing a procedure for wide beam design. This embodiment can employ a processor in an electronic device, such as processor 410 in device 400 or a module within such processor, which can be in combination with a memory such as memory 430 and/or 435 in storage device 415, or the embodiment could be a non-transitory, computer-readable medium that stores instructions that when executed by a processor (such as processor 225 or 410) causes the electronic device to run method 1100. Such functions could also be provided other embodiments including any of base stations 101-103 using processor 225 and/or memory 230. Moreover, calculations could be performed using one of more units described in network 100, such as network 130, server 134, or client device 136. Even units such as 115 could relay or perform calculations. Any of these units could be used in concert with the antenna 500 to perform the method 1100. Furthermore, all the calculations described in this disclosure could be performed by the units described above either singularly or in any combination.

In FIG. 11, method 1100 first accepts inputs in step 1101 as to the array size, antenna element spacing, phase-shifter resolution, specified coverage region, antenna element pattern, initial beam, etc. Then the processor formulates a concave utility maximization problem in step 1102 and could adopt the cyclic coordinate descent algorithm to design the wide beam. In step 1103, it outputs a beamforming vector and a beam pattern. Next, in step 1104, it checks the wide beam pattern to determine whether the wide beam pattern meets the design specification(s), for example, such as whether the peak gain is larger enough, the beamwidth is acceptable, lack of a coverage hole, etc. If the specifications are met, then in step 1105, it outputs a beam candidate. Otherwise, in step 1106, it chooses another initialization and runs the cyclic coordinate descent algorithm again to solve the concave utility maximization problem. The iterations could repeat several times before finding a beam meeting all the specifications. Once candidates are output, then a codebook can be compiled.

Inputs into this framework of the disclosed wide beam deign method can include the following inputs in step 1101 of the method 1100:

$N_h, N_v$: size of the uniform planar array, e.g.:
$$N_h = N_v = 8 \tag{13}$$

$d_h, d_v$: element spacing(unit: $\lambda$), e.g.: $d_h = d_v = 0.47\lambda$ (14)

$b$: Phase-shifter resolution, e.g.: $b = 5$ (15)

Specified coverage region, e.g.:
$$\sqrt{(\theta - \theta_c)^2 + (\phi - \phi_c)^2} \leq 11° \tag{16}$$

$p(\theta, \phi)$: Antenna element pattern, e.g.: HQ element pattern(default value),isotropic pattern (17)

$w_0$: Initial beam, e.g.: the narrow beam pointing to the boresight direction (18)

When processed thru the concave utility function in step 1102, the outputs in steps 1103 are the following:

$w$: a $N_h N_v \times 1$ which is the beamforming vector and (19)

$P(\theta, \phi)$ which is the beam pattern. (20)

After this step, then the results are checked in step 1104 to determine whether they meet the specifications on peak gain and half-power beam-width (HPBW). If they do meet the specifications, then the beam is outputted in step 1105. If not, then the initialization $w_0$ is changed as shown in step 1106.

Figure 12A:
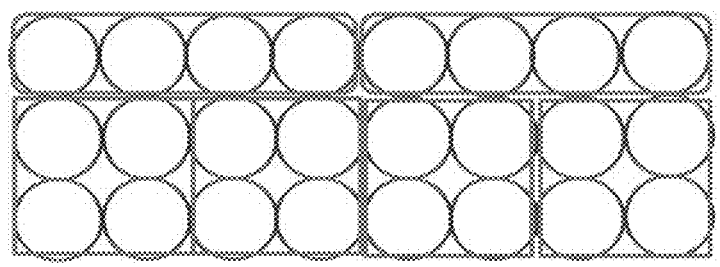
FIGS. 12A and 12B illustrate examples WB codebooks including different WBs according to embodiments of the present disclosure.
Figure 12A:
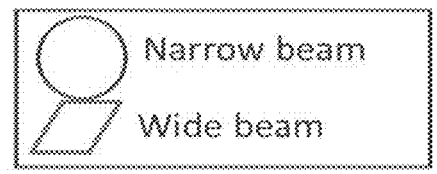
Figure 12B:
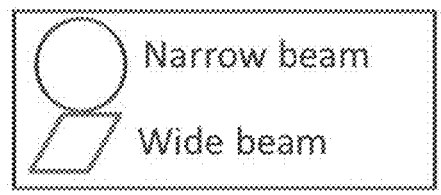
Figure 12B:
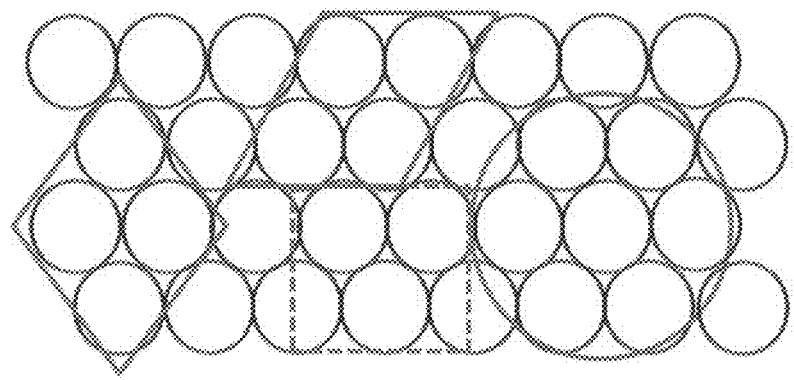

FIGS. 12A-12B illustrate, in another non-limiting embodiment, that a single WB codebook could include various shapes of WBs, each showing in a key that the circles represent the NBs while the angular shapes represent the WBs. One benefit of having various shapes of WBs within the same codebook is to support different distribution of NB; such code books being produced in accordance with the above descriptions and utilizing the units described in the discussion under FIG. 11 and antennas 500 and 600.

FIG. 12A, for example, illustrates a grid distribution of the NBs and the corresponding WBs. The NB codebook in FIG. 12A includes 3×8 NBs. It is impossible to use, for instance, 3 WBs of square shape to cover those NBs without overlapping. Instead, the FIG. 12A uses the square-shape WBs to cover the second and third rows, while the bar-shape WBs to cover the first row.

FIG. 12B, illustrates a zig-zag distribution of the NBs and the corresponding WBs. In such a case, it would not appropriate to adopt square-shape WBs as shown in the dotted line square in FIG. 12B. Instead, a parallelogram, a diamond-shape, and even a larger circular shape (not shown in the key) WBs are adopted in FIG. 12B.

In another non-limiting embodiment, the WBs in a single WB codebook could cover different number of the narrow beams. In the example shown in FIG. 12B, a WB could cover 4 or 7 NBs. Moreover, if the total number of the NBs is a prime number, for example, 29, then it is impossible to have a WB codebook with same NBs per WB.

In another non-limiting embodiment, the WB shape and size are determined by the deployment scenario. In a cell with high buildings, the WBs could have a tall shape, which is wide in the vertical direction, but narrow in the horizontal direction. In a cell covering a plaza area without high buildings, the WBs could have a broad shape, which is wide in the horizontal direction, but narrow in the vertical direction.

In another non-limiting embodiment, the WB beam shape and size could be determined through a simulation of the UE dropping and UE movement in the cellular network. The UE could be dropped on a street and/or in a building and simulate their movement. Checking the performance, includes but not would not be limited to:

The average received WB signal strength of the UE,
WB switch frequency as the UE moves,
The hierarchical beam search accuracy, and
The received WB signal strength for the UE on the cell edge.

Figure 13:
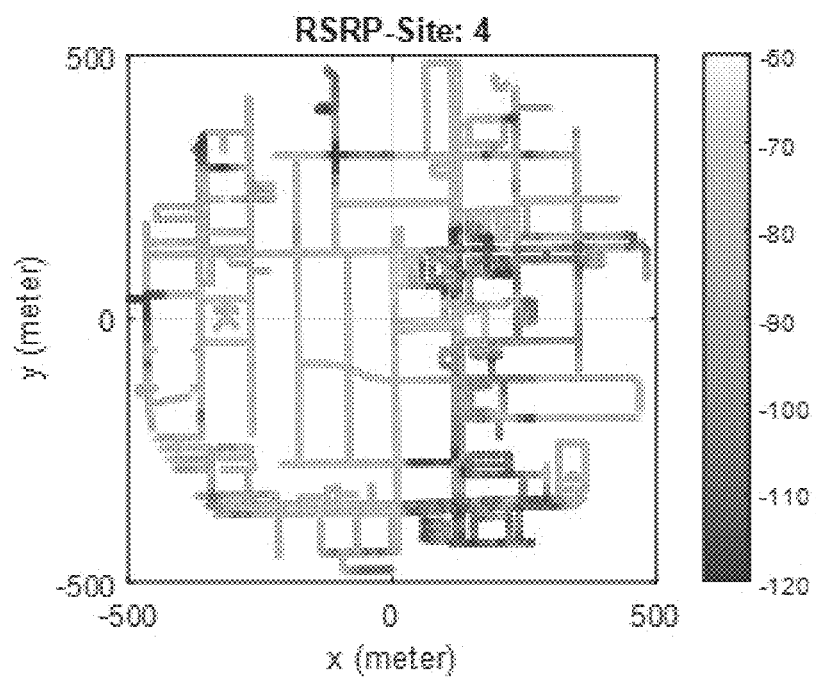
FIG. 13 illustrates the RSRP distribution of a 3-sector cell according to embodiments of the present disclosure.

FIG. 13 illustrates an example of the WB RSRP distribution of a 3-sector cell. In this example, the BS is located at the point (0, 0), and the UE are dropped on the street. The average WB RSRP and cell-edge WB RSRP could be used as the performance metric to determine the best WB shape and size.

In yet another non-limiting embodiment, the NBs pointing to the cell-center could be covered by a large WB, thus reducing the number of WB s, while the NBs pointing to the cell-edge could be covered by a small WB, thus compensating the high path-loss.

Figure 14:
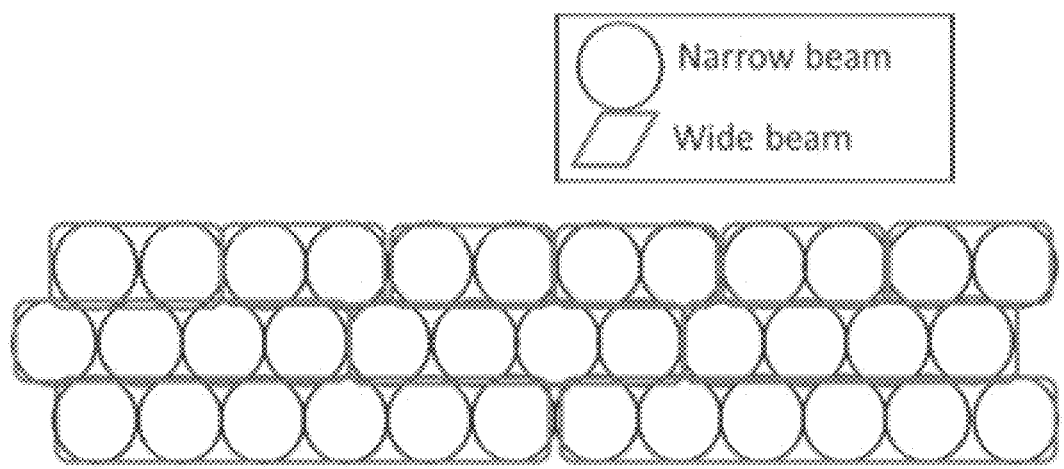
FIG. 14 illustrates WB beamwidth being dependent on the path loss of the pointing direction according to embodiments of the present disclosure.

FIG. 14 illustrates an example, where there are three rows of NBs. Assume that the top row beams are serving the cell-edge far UE and the bottom row beams are for the cell-center close UE. The WBs are designed in a way that the bottom row WBs cover 6 NBs, the center row 4 NBs, and the top row 2 NBs.

In one non-limiting embodiment, the WB codebook design takes into account the road directions and WB switching frequency. The WB switching usually incurs the signaling overhead and/or triggers a prohibit timer to freeze the beam tracking operation for a while (e.g., 100 ms). Frequent WB switching can degrade the UE throughput, and the WB codebook with less frequent WB switch is preferred.

FIG. 15A and FIG. 15B illustrate two different WB codebooks, 1500A and 1500B, generated as described above coming from a base station such as BS 102 or as shown by FIGS. 2, 4, 5, and 6, serving a 120-degree cell sector, with a UE, such as any shown in FIG. 1, moving along the path indicated by the arrow in each figure, namely, 1501A and 1501B. In FIG. 15A, the WB codebook 1500A results in a higher WB switching frequency than in WB codebook 1500B of FIG. 15B. FIG. 15A shows three wide beams covering the cell edge 1502A, cell middle 1503A, and cell center area 1504A. FIG. 15B shows 4 wide beams, each of them covering 30-deg region (1502B, 1503B, 1504B, and 1505B). The two designs are likely to result in different frequencies of WB switching. For example, consider that a UE moves along a road from west to east in FIG. 15A where UE switches the WB around 2 times such that the UE path 1501A passes through areas 1502A, 1503A, and 1504A. In FIG. 15B, however, there is no WB switches when the UE moves along the same route such that the UE path 1501B passes only through area 1503B.

In another particular non-limiting embodiment, if the NB codebook is site-specific, then the wide beam codebook, which builds on top of the NB codebook, should also be site-specific. For example, the NB and WB codebook are generated based on the ray-tracing data and thus site-specific.

In yet another non-limiting embodiment, the WB codebook could be dependent on the mechanical tilting or electrical titling angles. As the titling angle changes, the region served by the NBs could change. For example, the NBs previously serving cell-edge UE, now serves the cell center UEs. The WB codebook thus should change as well. In one non-limiting option, the BS could design multiple WB codebooks for different tilting angles and save them in the memory. In an online deployment, the BS retrieves from its memory the WB codebook corresponding to its tilting angle. If the titling angle changes with time, the WB codebook should also change accordingly.

In still another non-limiting embodiment, the beam width of WB is dependent on the statistics of the online UE report. In one non-limiting option, the BS examines the best beam index and signal strength (e.g., CSI-RS L1-RSRP, CSI-RS CQI, etc.) reported by UEs. If BS finds that some NBs show relatively weak signal strength generally, the BS could infer that the channel of those NBs are bad, for example, where there is large path-loss or penetration loss for those NBs. Therefore, the BS could design or adopt a narrower WB to cover those NBs. On the other hand, if there are some NBs showing relatively strong signal strength, the BS could design or adopt a wider WB to cover those NBs.

In still yet another non-limiting embodiment, the WB codebook design takes into account the chance of WB switching during the site-specific UE movement. The street network of each cell could be significantly different and the WB switching chance could be quite different when applying a same WB codebook. Therefore, the site-specific WB codebook is needed to reduce the WB switching chance. In one non-limiting option, it can be done by simulating the UE movement in the cell and compare the resulting the WB switching chances. The WB codebook resulting a small WB switching chance could be finally chosen.

In yet another non-limiting embodiment, a non-transitory computer readable medium includes a plurality of instructions. The plurality of instructions, when executed by at least one processor, is configured to cause the at least one processor to perform any of the functions or features of any, several, or all of the various non-limiting embodiments described herein above and further described in specifics hereinbelow. Such processor(s) could also be considered as controllers of various devices.

A non-limiting embodiment, which could be labeled as example 1, is a method comprising: identifying input data including at least one of an array size, an antenna element spacing, a phase-shifter resolution, a specified coverage region, or an antenna element pattern; processing the input data and an initial beam through a non-decreasing concave utility function using a cyclic coordinate descent algorithm to generate a wide beam meeting one or more design specifications; and producing a codebook including the wide beam.

Another non-limiting embodiment, which could be labeled as example 2, is the method of example 1, wherein processing the input data to generate the wide beam further comprises: maximizing the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

Another non-limiting embodiment, which could be labeled as example 3, is the method of example 2, wherein maximizing the non-decreasing concave utility function further comprises: using angular directions from a specified coverage region, with an array response at direction $a(\theta, \phi)$, beamforming weights of the wide beam as w, beam gain pattern is $P(\theta, \phi)=p(\theta, \phi)w^H a(\theta, \phi)a(\theta, \phi)^H w$; and identifying an equation:

$$\max_w \sum_{(\theta,\phi)\in C} f(p(\theta, \phi)w^H a(\theta, \phi)a(\theta, \phi)^H w),$$

wherein C is an angular coverage region, $a(\theta, \phi)$ is the array response, $p(\theta, \phi)$ is the antenna element pattern, and $f(x)$ is the non-decreasing concave utility function.

Another non-limiting embodiment, which could be labeled as example 4, is the method of example 1, wherein processing the input data to generate the wide beam further comprises one or more of: selecting the wide beam as having a largest minimal gain over the specified coverage region, wherein the largest minimal gain meets the one or more design specifications; varying the input data; or choosing a design requirement comprising one of more of mean gain and mean data rate.

Another non-limiting embodiment, which could be labeled as example 5, is the method of example 1, further comprising generating the wide beam to cover a region comprising combinations of narrow beams by at least one of: shaping the wide beam based on location of a main lobe for each of the narrow beams; shaping the wide beam based on a contour of a composite radiation pattern of the narrow beams; or shaping the wide beam based on one of three coverage regions centered at a direction $(\theta_c, \phi_c)$ and represented by: Diamond: $|\theta-\theta_c|+|\phi-\phi_c|\leq d$, Circle: $\sqrt{(\theta-\theta_c)^2+(\phi-\phi_c)^2}\leq d$, or Square: $\max(|\theta-\theta_c|, |\phi-\phi_c|)\leq d$, wherein d is a parameter used to adjust beamwidth; and wherein the generated wide beam comprises a beamforming vector and a beam pattern.

Another non-limiting embodiment, which could be labeled as example 6, is the method of claim 1, wherein: the one or more design specifications include at least one of a peak gain, a half-power beamwidth (HPBW), or lack of coverage holes, and the codebook comprises a plurality of wide beams of various shapes and can cover a different number of narrow beams.

Another non-limiting embodiment, which could be labeled as example 7, is the method of example 1, further comprising using the codebook to at least one of: depend on the size of the wide beam by applying a smaller size wide beam for a cell-center area and a larger size wide beam for a cell-edge area, wherein size is a function of a number of narrow beams covered by the generated wide beam; or favor a lesser wide beam switching frequency to support at least one mobile user equipment (UE).

Yet another non-limiting embodiment, which could be labeled as example 8, is an electronic device comprising: a memory configured to store a hierarchical codebook; and a processor operably connected to the memory, the processor configured to: identify input data including at least one of an array size, an antenna element spacing, a phase-shifter resolution, a specified coverage region, or an antenna element pattern; process the input data and an initial beam through a non-decreasing concave utility function using a cyclic coordinate descent algorithm to generate a wide beam meeting one or more design specifications; and produce a codebook including the wide beam.

Yet another non-limiting embodiment, which could be labeled as example 9, is the electronic device of example 8, wherein to process the input data to generate the wide beam, the processor is further configured to maximize the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

Yet another non-limiting embodiment, which could be labeled as example 10, is the electronic device of example 9, wherein to maximize the non-decreasing concave utility function, the processor is further configured to: use angular directions from a specified coverage region, with an array response at direction a(θ, ϕ), beamforming weights of the wide beam as w, beam gain pattern is P(θ, ϕ)=p(θ, ϕ)$w^H$a(θ, ϕ)a(θ, ϕ)$^H$w; and identify an equation:

$$\max_w \sum_{(\theta,\phi)\in C} f(p(\theta, \phi)w^H a(\theta, \phi)a(\theta, \phi)^H w),$$

wherein C is an angular coverage region, a(θ, ϕ) is the array response, p(θ, ϕ) is the antenna element pattern, and ƒ(x) is the non-decreasing concave utility function.

Yet another non-limiting embodiment, which could be labeled as example 11, is the electronic device of example 8, wherein to process the input data to generate the wide beam, the processor is further configured to one or more of: selecting the wide beam as having a largest minimal gain over the specified coverage region, wherein the largest minimal gain meets the one or more design specifications; varying the input data; or choosing a design requirement comprising one of more of mean gain and mean data rate.

Yet another non-limiting embodiment, which could be labeled as example 12, is the electronic device of example 8, wherein the processor is further configured to: generate the wide beam to cover a region comprising combinations of narrow beams by at least one of: shape the wide beam based on location of a main lobe for each of the narrow beams; shape the wide beam based on a contour of a composite radiation pattern of the narrow beams; or shape the wide beam based on one of three coverage regions centered at a direction ($\theta_c$, $\phi_q$) and represented by: Diamond: |θ−$θ_c$|+|ϕ−$\phi_c$|≤d, Circle: $\sqrt{(\theta-\theta_c)^2+(\phi-\phi_c)^2}$≤d, or Square: max(|θ−$θ_c$|, |ϕ−$\phi_c$|)≤d, wherein d is a parameter used to adjust beamwidth; and wherein the generated wide beam comprises a beamforming vector and a beam pattern.

Yet another non-limiting embodiment, which could be labeled as example 13, is the electronic device of example 8, wherein: the one or more design specifications include at least one of a peak gain, a half-power beamwidth (HPBW), or lack of coverage holes, and the codebook comprises a plurality of wide beams of various shapes and can cover a different number of narrow beams.

Yet another non-limiting embodiment, which could be labeled as example 14, is the electronic device of example 13, wherein the processor is further configured to: use the codebook to at least one of: depend on the size of the wide beam by applying a smaller size wide beam for a cell-center area and a larger size wide beam for a cell-edge area, wherein size is a function of a number of narrow beams covered by the generated wide beam; or favor a lesser wide beam switching frequency to support at least one mobile user equipment (UE).

Still another non-limiting embodiment, which could be labeled as example 15, is a non-transitory, computer-readable medium storing instructions that, when executed by a processor of an electronic device, cause the electronic device to: identify input data including at least one of an array size, an antenna element spacing, a phase-shifter resolution, a specified coverage region, or an antenna element pattern; process the input data and an initial beam through a non-decreasing concave utility function using a cyclic coordinate descent algorithm to generate a wide beam meeting one or more design specifications; and produce a codebook including the wide beam.

Still another non-limiting embodiment, which could be labeled as example 16, is the non-transitory, computer-readable medium storing instructions of example 15, wherein the instructions to process the input data to generate the wide beam further comprise instructions that, when executed by the processor, cause the electronic device to maximize the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

Still another non-limiting embodiment, which could be labeled as example 17, is the non-transitory, computer-readable medium storing instructions of example 16, wherein the instructions to maximize the non-decreasing concave utility function further comprise instructions that, when executed by the processor, cause the electronic device to: use angular directions from a specified coverage region, with an array response at direction a(θ, ϕ), beamforming weights of the wide beam as w, beam gain pattern is P(θ, ϕ)=p(θ, ϕ)$w^H$a(θ, ϕ)a(θ, ϕ)$^H$w; and identify an equation:

$$\max_w \sum_{(\theta,\phi)\in C} f(p(\theta, \phi)w^H a(\theta, \phi)a(\theta, \phi)^H w),$$

wherein C is an angular coverage region, a(θ, ϕ) is the array response, p(θ, ϕ) is the antenna element pattern, and ƒ(x) is the non-decreasing concave utility function.

Still another non-limiting embodiment, which could be labeled as example 18, is the non-transitory, computer-readable medium storing instructions of example 15, wherein the instructions to process the input data to generate the wide beam further comprise instructions that, when executed by the processor, cause the electronic device one or more of: select the wide beam as having a largest minimal gain over the specified coverage region, wherein the largest minimal gain meets the one or more design specifications; vary the input data; or choose a design requirement comprising one of more of mean gain and mean data rate.

Still another non-limiting embodiment, which could be labeled as example 19, is the non-transitory, computer-readable medium storing instructions of example 15, wherein further comprising instructions that, when executed by the processor, cause the electronic device to: generate the wide beam to cover a region comprising combinations of narrow beams by at least one of: shape the wide beam based on location of a main lobe for each of the narrow beams; shape the wide beam based on a contour of a composite radiation pattern of the narrow beams; or shape the wide beam based on one of three coverage regions centered at a direction $(\theta_c, \phi_c)$ and represented by: Diamond: $|\theta-\theta_c|+|\phi-\phi_c|\leq d$, Circle: $\sqrt{(\theta-\theta_c)^2+(\phi-\phi_c)^2}\leq d$, orn Square: $\max(|\theta-\theta_c|, |\phi-\phi_c|)\leq d$, wherein d is a parameter used to adjust beamwidth; and wherein the generated wide beam comprises a beamforming vector and a beam pattern.

Still another non-limiting embodiment, which could be labeled as example 20, is the non-transitory, computer-readable medium storing instructions of example 15, wherein: the one or more design specifications include at least one of a peak gain, a half-power beamwidth (HPBW), or lack of coverage holes, and the codebook comprises a plurality of wide beams of various shapes and can cover a different number of narrow beams.

And, lastly, still another non-limiting embodiment, which could be labeled as example 21, is the non-transitory, computer-readable medium storing instructions of example 15, wherein further comprising instructions that, when executed by the processor, cause the electronic device to: depend on the size of the wide beam by applying a smaller size wide beam for a cell-center area and a larger size wide beam for a cell-edge area, wherein size is a function of a number of narrow beams covered by the generated wide beam; and favor a lesser wide beam switching frequency to support at least one mobile user equipment (UE).

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method comprising:
   identifying input data including at least one of an array size, an antenna element spacing, a phase-shifter resolution, a specified coverage region, or an antenna element pattern;
   processing the input data and an initial beam through a non-decreasing concave utility function using a cyclic coordinate descent algorithm to generate a wide beam meeting one or more design specifications; and
   producing a codebook including the wide beam.

2. The method of claim 1, wherein processing the input data to generate the wide beam further comprises:
   maximizing the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

3. The method of claim 2, wherein maximizing the non-decreasing concave utility function further comprises: using angular directions from a specified coverage region, with an array response at direction $a(\theta, \phi)$, beamforming weights of the wide beam as w, beam gain pattern is $P(\theta, \phi)=p(\theta, \phi)w^H a(\theta, \phi)a(\theta, \phi)^H w$; and
   identifying an equation:

$$\max_w \sum_{(\theta,\phi)\in C} f\left(p(\theta, \phi)w^H a(\theta, \phi)a(\theta, \phi)^H w\right),$$

wherein C is an angular coverage region, $a(\theta, \phi)$ is the array response, $p(\theta, \phi)$ is the antenna element pattern, and $f(x)$ is the non-decreasing concave utility function.

4. The method of claim 1, wherein processing the input data to generate the wide beam further comprises one or more of:
   selecting the wide beam as having a largest minimal gain over the specified coverage region, wherein the largest minimal gain meets the one or more design specifications;
   varying the input data; or
   choosing a design requirement comprising one of more of mean gain and mean data rate.

5. The method of claim 1, further comprising generating the wide beam to cover a region comprising combinations of narrow beams by at least one of:
   shaping the wide beam based on location of a main lobe for each of the narrow beams;
   shaping the wide beam based on a contour of a composite radiation pattern of the narrow beams; or
   shaping the wide beam based on one of three coverage regions centered at a direction $(\theta_c, \phi_c)$ and represented by:

Diamond: $|\theta-\theta_c|+|\phi-\phi_c|\leq d$,

Circle: $\sqrt{(\theta-\theta_c)^2+(\phi-\phi_c)^2}\leq d$, or

Square: $\max(|\theta-\theta_c|,|\phi-\phi_c|)\leq d$, wherein d is a parameter used to adjust beamwidth; and
   wherein the generated wide beam comprises a beamforming vector and a beam pattern.

6. The method of claim 1, wherein:
   the one or more design specifications include at least one of a peak gain, a half-power beamwidth (HPBW), or lack of coverage holes, and
   the codebook comprises a plurality of wide beams of various shapes and can cover a different number of narrow beams.

7. The method of claim 1, further comprising using the codebook to at least one of:
   depend on the size of the wide beam by applying a smaller size wide beam for a cell-center area and a larger size wide beam for a cell-edge area, wherein size is a function of a number of narrow beams covered by the generated wide beam; or
   favor a lesser wide beam switching frequency to support at least one mobile user equipment (UE).

8. An electronic device comprising:
   a memory configured to store a hierarchical codebook; and
   a processor operably connected to the memory, the processor configured to:
      identify input data including at least one of an array size, an antenna element spacing, a phase-shifter resolution, a specified coverage region, or an antenna element pattern;

process the input data and an initial beam through a non-decreasing concave utility function using a cyclic coordinate descent algorithm to generate a wide beam meeting one or more design specifications; and produce a codebook including the wide beam.

9. The electronic device of claim 8, wherein to process the input data to generate the wide beam, the processor is further configured to maximize the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

10. The electronic device of claim 9, wherein to maximize the non-decreasing concave utility function, the processor is further configured to:

use angular directions from a specified coverage region, with an array response at direction $a(\theta, \phi)$, beamforming weights of the wide beam as w, beam gain pattern is $P(\theta, \phi)=p(\theta, \phi)w^H a(\theta, \phi)a(\theta, \phi)^H w$; and identify an equation:

$$\max_w \sum_{(\theta,\phi)\in C} f(p(\theta, \phi)w^H a(\theta, \phi)a(\theta, \phi)^H w),$$

wherein C is an angular coverage region, $a(\theta, \phi)$ is the array response, $p(\theta, \phi)$ is the antenna element pattern, and $f(x)$ is the non-decreasing concave utility function.

11. The electronic device of claim 8, wherein to process the input data to generate the wide beam, the processor is further configured to one or more of:

selecting the wide beam as having a largest minimal gain over the specified coverage region, wherein the largest minimal gain meets the one or more design specifications;

varying the input data; or choosing a design requirement comprising one of more of mean gain and mean data rate.

12. The electronic device of claim 8, wherein the processor is further configured to:

generate the wide beam to cover a region comprising combinations of narrow beams by at least one of:

shape the wide beam based on location of a main lobe for each of the narrow beams;

shape the wide beam based on a contour of a composite radiation pattern of the narrow beams; or shape the wide beam based on one of three coverage regions centered at a direction $(\theta_c, \phi_c)$ and represented by:

Diamond: $|\theta-\theta_c|+|\phi-\phi_c|\leq d$,

Circle: $\sqrt{(\theta-\theta_c)^2+(\phi-\phi_c)^2}\leq d$, or

Square: $\max(|\theta-\theta_c|,|\phi-\phi_c|)\leq d$, wherein d is a parameter used to adjust beamwidth; and wherein the generated wide beam comprises a beamforming vector and a beam pattern.

13. The electronic device of claim 8, wherein:

the one or more design specifications include at least one of a peak gain, a half-power beamwidth (HPBW), or lack of coverage holes, and the codebook comprises a plurality of wide beams of various shapes and can cover a different number of narrow beams.

14. The electronic device of claim 8, wherein the processor is further configured to:

use the codebook to at least one of:

depend on the size of the wide beam by applying a smaller size wide beam for a cell-center area and a larger size wide beam for a cell-edge area, wherein size is a function of a number of narrow beams covered by the generated wide beam; or favor a lesser wide beam switching frequency to support at least one mobile user equipment (UE).

15. A non-transitory, computer-readable medium storing instructions that, when executed by a processor of an electronic device, cause the electronic device to:

identify input data including at least one of an array size, an antenna element spacing, a phase-shifter resolution, a specified coverage region, or an antenna element pattern;

process the input data and an initial beam through a non-decreasing concave utility function using a cyclic coordinate descent algorithm to generate a wide beam meeting one or more design specifications; and produce a codebook including the wide beam.

16. The non-transitory, computer-readable medium of claim 15, wherein the instructions to process the input data to generate the wide beam further comprise instructions that, when executed by the processor, cause the electronic device to maximize the non-decreasing concave utility function with multiple random initial beamforming weights, wherein the non-decreasing concave utility function has a gradient or a sub gradient and wherein the cyclic coordinate decent algorithm sequentially updates each beamforming weight until convergence.

17. The non-transitory, computer-readable medium of claim 16, wherein the instructions to maximize the non-decreasing concave utility function further comprise instructions that, when executed by the processor, cause the electronic device to:

use angular directions from a specified coverage region, with an array response at direction $a(\theta, \phi)$, beamforming weights of the wide beam as w, beam gain pattern is $P(\theta, \phi)=p(\theta, \phi)w^H a(\theta, \phi)a(\theta, \phi)^H w$; and identify an equation:

$$\max_w \sum_{(\theta,\phi)\in C} f(p(\theta, \phi)w^H a(\theta, \phi)a(\theta, \phi)^H w),$$

wherein C is an angular coverage region, $a(\theta, \phi)$ is the array response, $p(\theta, \phi)$ is the antenna element pattern, and $f(x)$ is the non-decreasing concave utility function.

18. The non-transitory, computer-readable medium of claim 15, wherein the instructions to process the input data to generate the wide beam further comprise instructions that, when executed by the processor, cause the electronic device one or more of:

select the wide beam as having a largest minimal gain over the specified coverage region, wherein the largest minimal gain meets the one or more design specifications;

vary the input data; or choose a design requirement comprising one of more of mean gain and mean data rate.

19. The non-transitory, computer-readable medium of claim 15, wherein further comprising instructions that, when executed by the processor, cause the electronic device to:

generate the wide beam to cover a region comprising combinations of narrow beams by at least one of:

shape the wide beam based on location of a main lobe for each of the narrow beams;

shape the wide beam based on a contour of a composite radiation pattern of the narrow beams; or shape the wide beam based on one of three coverage regions centered at a direction $(\theta_c, \phi_c)$ and represented by:

Diamond: $|\theta-\theta_c|+|\phi-\phi_c|\leq d,$

Circle: $\sqrt{(\theta-\theta_c)^2+(\phi-\phi_c)^2}\leq d,$ or

Square: $\max(|\theta-\theta_c|,|\phi-\phi_c|)\leq d,$ wherein d is a parameter used to adjust beamwidth; and wherein the generated wide beam comprises a beamforming vector and a beam pattern.

20. The non-transitory, computer-readable medium of claim 15, wherein:

the one or more design specifications include at least one of a peak gain, a half-power beamwidth (HPBW), or lack of coverage holes, and the codebook comprises a plurality of wide beams of various shapes and can cover a different number of narrow beams.

\* \* \* \* \*